United States Patent [19]

Stoops et al.

[11] Patent Number: 5,328,085
[45] Date of Patent: Jul. 12, 1994

[54] APPARATUS FOR APPLYING FLUX

[75] Inventors: Bradley N. Stoops; Melaney S. Stoops, both of Bay Village, Ohio

[73] Assignee: Precision Dispensing Equipment, Inc., Bay Village, Ohio

[21] Appl. No.: 931,786

[22] Filed: Aug. 18, 1992

[51] Int. Cl.5 ................................................ B23K 37/00
[52] U.S. Cl. ........................................ 228/33; 228/43; 118/687
[58] Field of Search ................. 228/207, 33, 43, 28, 228/35, 223; 222/63, 71, 504, 55; 118/315, 320, 325, 687, 679, 323

[56] References Cited

U.S. PATENT DOCUMENTS

| | | | |
|---|---|---|---|
| 4,196,839 | 4/1980 | Davis | 228/223 |
| 4,695,482 | 9/1987 | Weiswurm | 118/324 X |
| 4,697,730 | 10/1987 | Spigarelli et al. | 228/40 X |
| 4,708,281 | 11/1987 | Nelson et al. | 228/180.1 |
| 4,774,106 | 9/1988 | Kozono | 228/206 |
| 4,821,948 | 4/1989 | Fisher et al. | 228/223 |
| 4,899,924 | 2/1990 | Kawaguchi | 228/242 |
| 4,967,933 | 11/1990 | Maiorca et al. | 118/698 X |
| 4,986,462 | 1/1991 | Hethcoat | 228/180.1 |
| 5,024,856 | 6/1991 | Hohnerlein | 118/323 X |
| 5,038,706 | 8/1991 | Morris | 118/74 X |
| 5,042,708 | 8/1991 | Ledermann et al. | 228/55 |
| 5,052,338 | 10/1991 | Maiorca et al. | 118/323 X |
| 5,065,692 | 11/1991 | Hollesen et al. | 118/323 X |
| 5,065,932 | 11/1991 | Hayden et al. | 228/55 |
| 5,074,455 | 12/1991 | Peana et al. | 228/35 |
| 5,145,531 | 9/1992 | Turner et al. | 228/41 X |

FOREIGN PATENT DOCUMENTS 2-137668  5/1990  Japan ..................... 228/33

Primary Examiner—Paula A. Bradley
Assistant Examiner—Jeanne M. Elpel
Attorney, Agent, or Firm—Fay, Sharpe, Beall, Fagan, Minnich & McKee

[57] ABSTRACT

A dispensing apparatus for applying a thin stream of flux to a surface of a printed circuit board. The dispensing head travels at a high rate of speed relative to the board during the dispensing of flux to apply thin layers of flux thereto. Preferably, the dispensing head moves transversely to the work path of a conveyor that transports the board through a flux station, at a rate of approximately 20 to 90 inches per second. Tips that dispense the flux are angularly disposed relative to the board and, if desired, make multiple passes over the surface to coat selected regions twice. Either the board is incrementally advanced through the flux station or the dispensing head is incrementally advanced relative to the board so that flux is applied when the board is stationary.

19 Claims, 6 Drawing Sheets

APPARATUS FOR APPLYING FLUX

BACKGROUND OF THE INVENTION

This invention pertains to a method and apparatus for dispensing fluid materials, and more particularly to a method and apparatus for dispensing flux on a surface such as a printed circuit board. The invention is particularly applicable to dispensing a low solids flux and will be described with particular reference thereto. However, it will be appreciated that the invention has broader applications and may be advantageously employed with other types of fluxes.

In fabricating a printed circuit board (PCB), which defines a substrate surface for a printed circuit assembly, three general types of boards are frequently encountered. The first is known as a surface mount board in which only surface mount components are used. A method of securing these components to the board is known as reflow soldering where solder paste is placed on the board, and then the surface mount components located as desired. The solder paste is cured as the board is heated to reflow the solder and complete the electrical connection. Thereafter, the board is cleaned, and if a double-sided surface mount assembly is required, the same process is applied to the opposite side of the board.

The second type of board uses through hole components. As the name implies, these electrical components have leads that extend through holes or openings in the board. The leads are soldered to complete the electrical connection.

In a mixed technology board, a combination of surface mount components and through hole components are used. The surface mount components are assembled and soldered as described above. After the surface mount components are secured to the first side of the board, the through hole components are then located on the board with the component leads extending through openings in the board for a subsequent soldering process. If a double-sided assembly is envisioned, the board is inverted and the surface mount components are applied to the second surface.

In either situation, a soldering operation is required on one surface, typically the bottom surface, of the board. One common soldering process is known as wave soldering in which molten solder is pumped into a wave form and a conveyor assembly transports the board thereover. A surface of the board contacts the peak of the wave and the solder wets the protruding component leads. The solder is drawn up into the through holes to effectively and securely establish an electrical connection. The soldered board, including surface mount components previously adhesively secured to the board, requires subsequent cleaning.

The entire soldering process is actually comprised of three separate and essential steps which are normally performed within a single machine. These steps include (i) flux application, (ii) preheating the board, and (iii) soldering. Soldering flux is generally defined as "a chemically and physically active formula which promotes wetting of a metal surface by molten solder, by removing the oxide or other surface films from the base metals and the solder. The flux also protects the surfaces from reoxidation during soldering and alters the surface tension of the molten solder and the base metal." (Institute for Interconnecting and Packaging Electronic Circuits (IPC), ANSI/IPC/SF-818, "General Requirements for Electronic Soldering Fluxes" 1988 3.1.18) As described in depth in CLEANING PRINTED WIRING ASSEMBLIES IN TODAY'S ENVIRONMENT, edited by Les Hymes, and published by Van Nostrand Reinhold, a printed circuit board must be cleaned with flux to effectively prepare the board for soldering and properly wet the components.

Four general types of fluxes are in common commercial use. Of these, rosin based fluxes are the most widely used, even though they normally require a subsequent cleaning operation to remove rosin flux residue on the board. The residue can adversely impact subsequent testing of the printed circuit board.

Another major category of fluxes includes water soluble fluxes which, as the name suggests, are designed to be cleaned in an aqueous solution. For a variety of reasons, though, this technology is not yet readily accepted.

Likewise, a third category is synthetic activated fluxes, which are decreasing in demand for a number of reasons. For example, the residues must be removed with chlorofluorocarbon (CFC) based cleaners which raises environmental concerns.

A fourth type of flux receiving greater attention in light of the environmental concerns are termed low solids fluxes. Low solids fluxes contain small amounts of solids, e.g., five weight percent or less. Use of low solids fluxes are intended to limit the amount of residue remaining on the board after soldering is completed so that subsequent cleaning operations can be eliminated.

As alluded to above, commercial cleaning operations typically employ CFC's. Studies presently indicate that use of CFC's destroy, or adversely contribute to the destruction of, earth's stratospheric ozone. Thus, elimination of subsequent cleaning operations for printed circuit boards will, in turn, address environmental concerns of ozone depletion associated with post soldering cleaning processes.

Generally speaking, fluxes commonly incorporate a solvent, vehicle, activator, surfactant and antioxidant. The solvent is the liquid carrier for the flux ingredient. An isopropanol or similar type of alcohol is often used as the solvent. The vehicle component of the flux serves as a high temperature solvent during the subsequent soldering operation. The activator, on the other hand, removes contaminants such as oxides to present a wettable surface for the soldering operation. The surfactant encourages solder wetting while the antioxidant limits reoxidation of the component leads.

Known structures and methods for applying flux to a printed circuit board are described in U.S. Pat. No. 4,821,948. These conventional techniques include liquid wave, foaming, brushing, or spraying, all of which are deemed to be deficient in one manner or another in achieving the overall goals of uniformity and effectiveness of flux application.

Focusing more particularly on low solids fluxes, three methods are commonly used. The flux can be applied as a wave in a manner analogous to the wave soldering technique. An open bath of flux is pumped into a wave form and the board surface passed into the wave crest. In addition to problems associated with flux being inadvertently placed on the top of the board, the uniformity of application and ability to precisely control the amount of flux application can be problematic.

Moreover, since the bath of flux is exposed to atmosphere, the specific gravity of the flux is subject to change. With low solids fluxes, conventional techniques of controlling specific gravity with automatic density controllers is ineffective since the low amount of solids in the composition is sensitive to slight changes of solvent.

A foam fluxer may alternately be used. This flux application technique also has an open bath of flux through which air bubbles are passed to form a foam layer. The board is passed through the foam layer to apply the flux to the desired surface. Since this method also requires an open reservoir, control of the specific gravity of the flux is a concern. The bubbling and splattering associated with the foam fluxing technique lacks the desired uniformity and precision of application, along with the potential for flux to be deposited on the upper surface of the board.

The third commonly used technique of applying low solids flux to a board is spraying. The '948 patent describes one type of high velocity spray in which the flux is ultrasonically atomized. More particularly, the flux is dispersed into tiny droplets and directed into the path of a substantially laminar air flow to allegedly provide uniform flux application. An enclosing structure collects and exhausts the vapors that result from this flux application. Other sprays in which the flux is atomized, or a rotating drum spray in which the flux is atomized by an air knife from the surface of a rotating mesh drum, are known in the art.

As the spray nozzle and board move relative to one another according to the various spray techniques, the lack of uniformity of flux application is apparent. A phenomenon known as shadowing results from this relative motion and can be briefly described as areas adjacent a protruding component that fail to receive any flux, or an insufficient amount of flux, because of the relative motion. This is oftentimes categorized as a lack of uniform application, but is itself, a more particular specie of problem associated with the spray application.

Prior spraying techniques do not lend themselves to promotion of "wicking", which results from capillary action due to surface tension. Fluid material naturally tends to adopt the configuration having the lowest surface tension, and it is observed that prior techniques do not take advantage of cohesive and adhesive forces that result in flux material being attracted to desired soldering locations.

The subject invention is deemed to provide a new apparatus and method that overcomes all of the above referred to problems and others and provides for an even, uniform, and precisely controlled application of flux to a surface.

SUMMARY OF THE INVENTION

According to the present invention, there is provided a method and apparatus of applying flux to a surface at a high rate of speed, in the general range of twenty (20) to ninety (90) inches per second with the preferred speed on the order of approximately forty (40) inches per second.

According to another aspect of the invention, the flux is dispensed in a thin stream.

According to still another aspect of the invention, a dispensing tip is tilted at an angle relative to the board and, if desired, a second dispensing tip disposed generally orthogonal to the first dispensing tip is passed over the same general work path to coat a predetermined area twice.

According to yet another aspect of the invention, the dispensing apparatus includes means for incrementally advancing one of the dispensing head and the printed circuit board.

According to a still further aspect of the invention, the dispensing head is reciprocated in a direction generally transverse to the direction of movement of the circuit board.

A principal advantage of the invention resides in a uniform, precisely controlled application of flux to a printed circuit board.

Another advantage of the invention is found in the ability to address the shadowing problem encountered with prior art arrangements.

Still another advantage is realized in the use of a low solids flux to address environmental concerns, and the ability to precisely apply flux to the printed circuit board.

Yet another advantage is the high rate of speed of flux application that dispenses an extremely thin layer of flux and, if desired, permits multiple passes over a surface.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments and methods of which will be described in detail in the specification and illustrated in the accompanying drawings which form a part hereof, and wherein.

DETAILED DESCRIPTION OF THE PREFERRED EMBODIMENT AND METHOD

Figure 1:
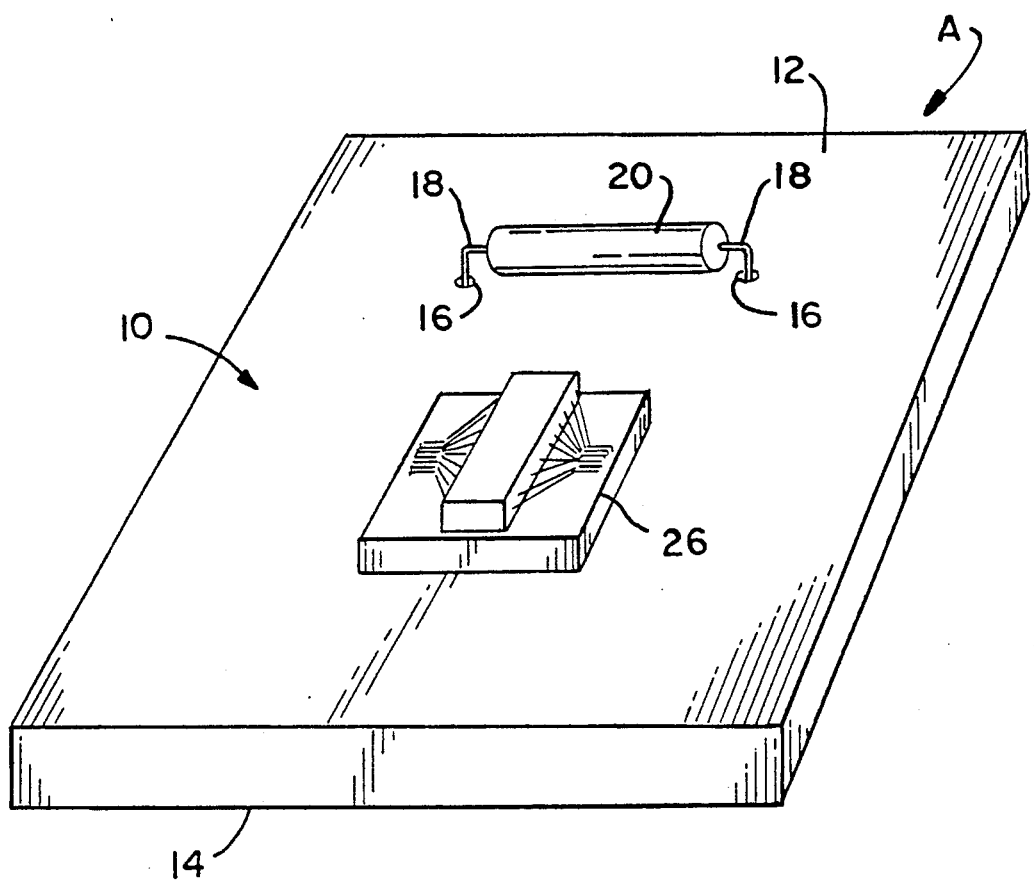
FIG. 1 is a perspective view of a mixed technology printed circuit board that incorporates surface mount and through hole components.

Referring now to the drawings wherein the showings are for purposes of illustrating the preferred embodiment and method of the invention only and not for purposes of limiting same, the FIGURES show a printed circuit board A which passes through an assembly process B that includes a fluxing system or station C, preheater D, and soldering system or station E. More particularly, a mixed technology printed circuit board A is illustrated and includes a board 10 comprised of an insulating material having a first or upper surface 12 and a second or lower surface 14. A series of through holes 16 receive leads 18 of a through hole component 20. The insulating material and through holes include selected areas of metal material associated with the component leads for establishing electrical communication as desired. Details of the printed circuit board technology in that regard are well known in the art, forming no part of the subject invention, so that further discussion is deemed unnecessary.

Additionally, surface mount components 26 are associated with the mixed technology circuit board. Again, the particulars of the surface mount component form no part of the subject invention and are merely illustrated and described herein to illustrate the applicability of the subject invention to a printed circuit board that employs only through hole components, or a mixed technology board. It is contemplated that the subject invention may also find application with printed circuit boards that have surface mount technology only. For example, the process and apparatus to be described below would dispense a flux on the surface, then potentially use a paste that has a reduced amount of, or lacks any, flux in the paste associated with surface mount technology.

Figure 2:
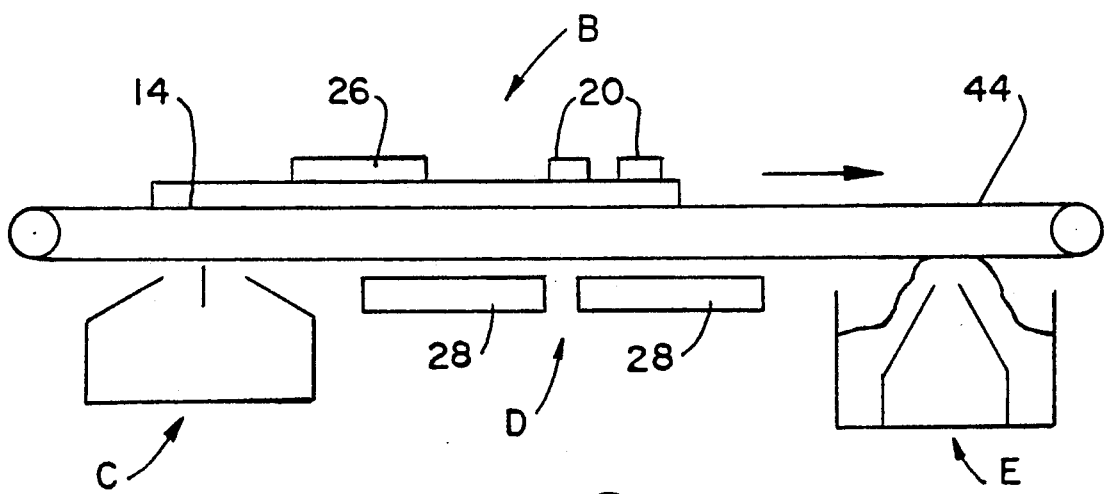
FIG. 2 is a schematic illustration of selected steps in the printed circuit board assembly process, namely the flux and solder application stages.

Leads extend outwardly from the mixed technology board 10 and are adapted for soldering to complete the connection with the metal layers. One well known type of soldering process passes the board over a wave of molten solder E so that each component lead is coated to complete the electrical connection. As best represented in FIG. 2, prior to passing over the wave solder E, the board surface 14, for example, is passed through a flux station C. A soldering flux is dispensed onto the selected surface, and as the board proceeds rightwardly as shown, the solvent is driven off at the preheating station D by means of conventional heating elements 28. The flux prepares the surface for the molten solder, removing oxides and other contaminants, and preparing the surface to promote solder wetting. The flux may also include an antioxidant that prevents further oxidation between the flux station and the soldering step.

The flux station C is more particularly illustrated in FIGS. 3–6. As shown there, a supporting framework 40 positions one or more dispensing heads 42 a predetermined distance above conveyor line 44. The conveyor line 44 may be of any well known structure, although a preferred arrangement is one manufactured and sold by Automation Technologies.

This particular conveyor is a simple, constant speed conveyor that feeds the printed circuit board beneath the dispensing head. Once located there, further movement of the board is terminated while the dispensing head proceeds through a flux applying routine, the movement of the head preferably being controlled by a microprocessor 46. For example, the dispensing head is an X - Y axis actuated assembly that incrementally moves the dispensing head over the stationary board along a first axis (X) generally parallel to the conveyor line. A second actuator moves the dispensing head laterally over the board along a second axis (Y). Because of the high rate of speed associated with the dispensing head as it travels laterally across the board, the entire dispensing operation can still fall within accepted rates of board throughput speed and remain compatible with commercially accepted rates of speed. Once the lateral travel of the head is completed, the dispensing head is then incrementally advanced along the first axis to position the dispensing head over another selected work path of the board. This process is continued until flux is dispensed over the desired portions of the board.

Alternatively, more expensive conveyors can be used that incrementally feed the board through the flux station. For example, the board is moved in one-eighth inch increments so that when stationary, multiple passes of the dispensing head will coat the selected surface with the flux. The dispensing head under this alternate arrangement need only be actuated in a lateral direction (along the second axis) since the relative motion between the board and dispensing head (along the first axis) is provided by the more complex and sophisticated conveyor system. Again, suitable microprocessor control and an associated control panel 46 is associated with the conveyor line and actuating mechanism for the dispensing head to control movement of the board through the flux station, as well as dispensing of flux on the selected portions of the board surface.

According to one commercially available fluxing system, a printed circuit board passes through an automated wave soldering station at a rate of approximately three to five inches per second. Typically, though, board speeds are much slower and average approximately one inch per second. This, in turn, requires the fluxing apparatus to maintain roughly the same rate of throughput speed. In known structures, the printed circuit board is advanced through the fluxing apparatus by means of a conveyor at this approximate rate and in a continuous movement therethrough. Accordingly, if flux is applied as a spray, the relative speed of movement is at best approximately three to five inches per second, while most fluxing assemblies provide a relative speed on the order of one inch per second.

According to the subject invention, the overall throughput speed of conveyor line 44 is still closely maintained at the approximate rate of one inch per second. More importantly, though, the printed circuit board is incrementally advanced through the fluxing station or the dispensing head is incrementally advanced over the board surface. That is, the board is accelerated, stopped, flux is applied, and the board accelerated for the next application of flux. Thus it will be understood that the application of flux to the board will be entirely completed while the board is stationary, or selected regions of the board will receive flux and the board incrementally advanced for another application of flux to a different region, etc.

Figure 4:
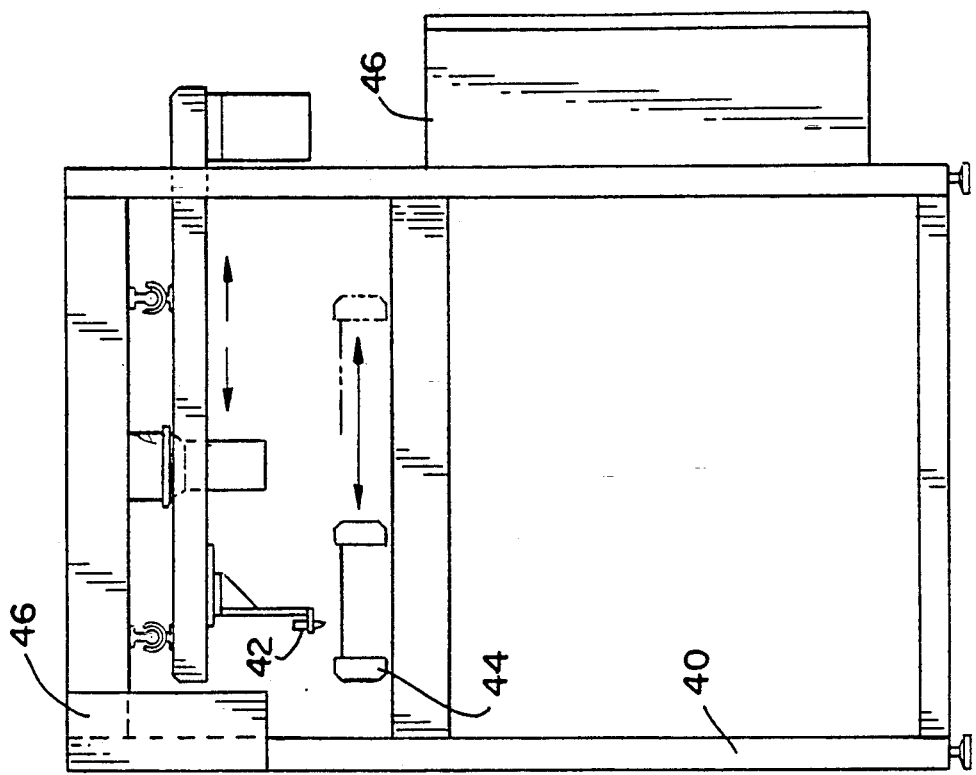
FIG. 4 is a side elevational view taken from the right-hand side of FIG. 3.

As best illustrated in FIG. 4, the dispensing head 42 travels generally transverse (along the second axis y) to the movement of the printed circuit board on conveyor line 44 (parallel to the first axis x). Thus, as the board is advanced by the conveyor, and when it reaches a stationary state, the dispensing head 42 is reciprocated at a high rate of speed transversely over the surface of the printed circuit board.

Through use of a low solids flux, and dispensing at a high rate of speed ranging between 20 an 90 inches per second, but preferably on the order of 40 inches per second, a very thin layer of flux is applied or coats the selected surface of the board. For example, tests have suggested application of a coating in a thin line approximately 0.115 inches in width and at a flow rate of 0.02 cc's per second provides an application of flux at the rate of 0.0002 g/in$^2$. Since a low solids flux material is used, multiple passes can be made over generally the same work path. This permits a second coating of flux without extending beyond accepted limit rates of flux application.

Figure 5:
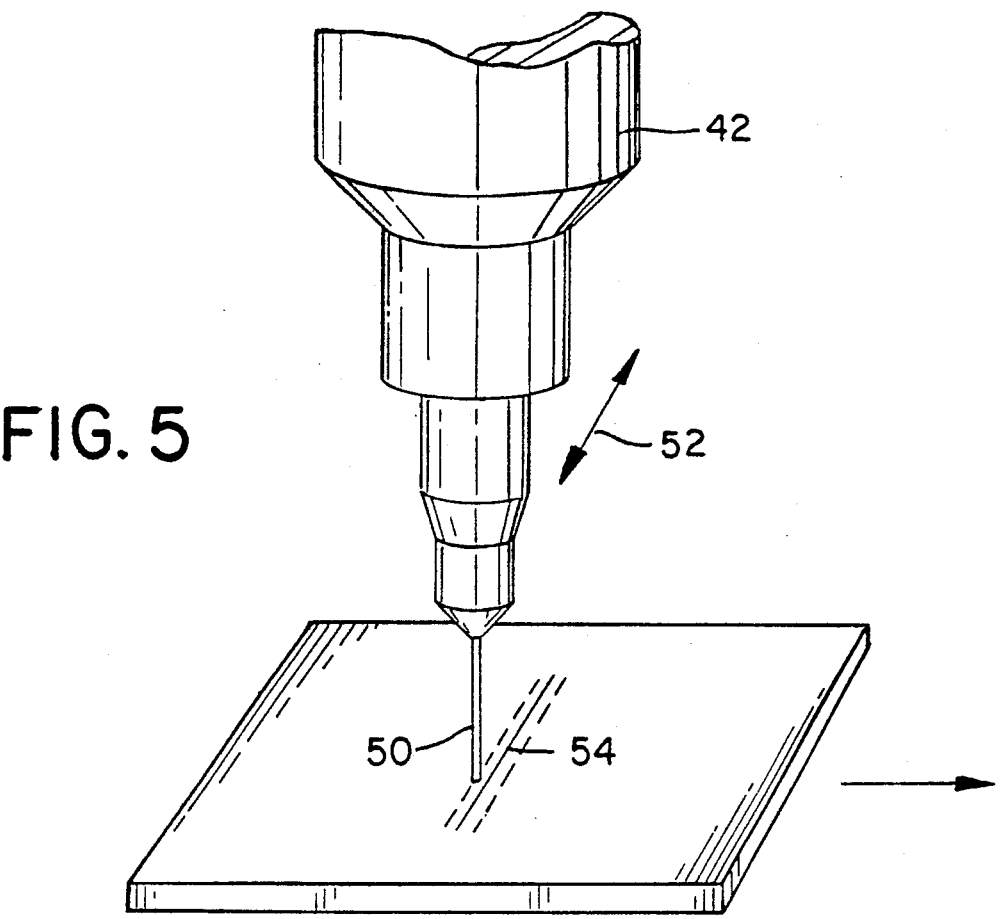
FIG. 5 is an enlarged perspective view of the dispenser head applying flux to the surface of a printed circuit board.

As illustrated in FIG. 5, the board 10 is incrementally advanced rightwardly (parallel to the first axis X) while the dispensing head 42 is reciprocated fore and aft (along the second axis Y). The dispensing head includes a needle or tip 50 that dispenses or applies the low solids flux in a continuous stream 54. The opening in the tip has an inner diameter in the range of 0.010 inches or less, and preferably on the order of 0.006 inches. Again, since the dispensing head is moved at a high rate of speed on the order of 40 inches per second, multiple passes can be made. Additionally, because of the incremental movement of the printed circuit board, an even and uniform application of the flux is achieved.

The thin stream of flux 54 naturally flows outwardly as represented by the dotted lines in FIG. 5. By carefully controlling the incremental movement of the tip 50, the next adjacent stream of flux can be precisely located so that the outward flow abuts with the flow of flux from a prior dispensed stream, slightly overlaps therewith, or has a large amount of overlap as desired or required for specific applications. If the adjacent stream is applied before the solvent is driven off, for example within two seconds, the outward flows of adjacent streams will merge and the applied streams become virtually indistinguishable, providing a uniform application of flux to the board surface.

Figure 3:
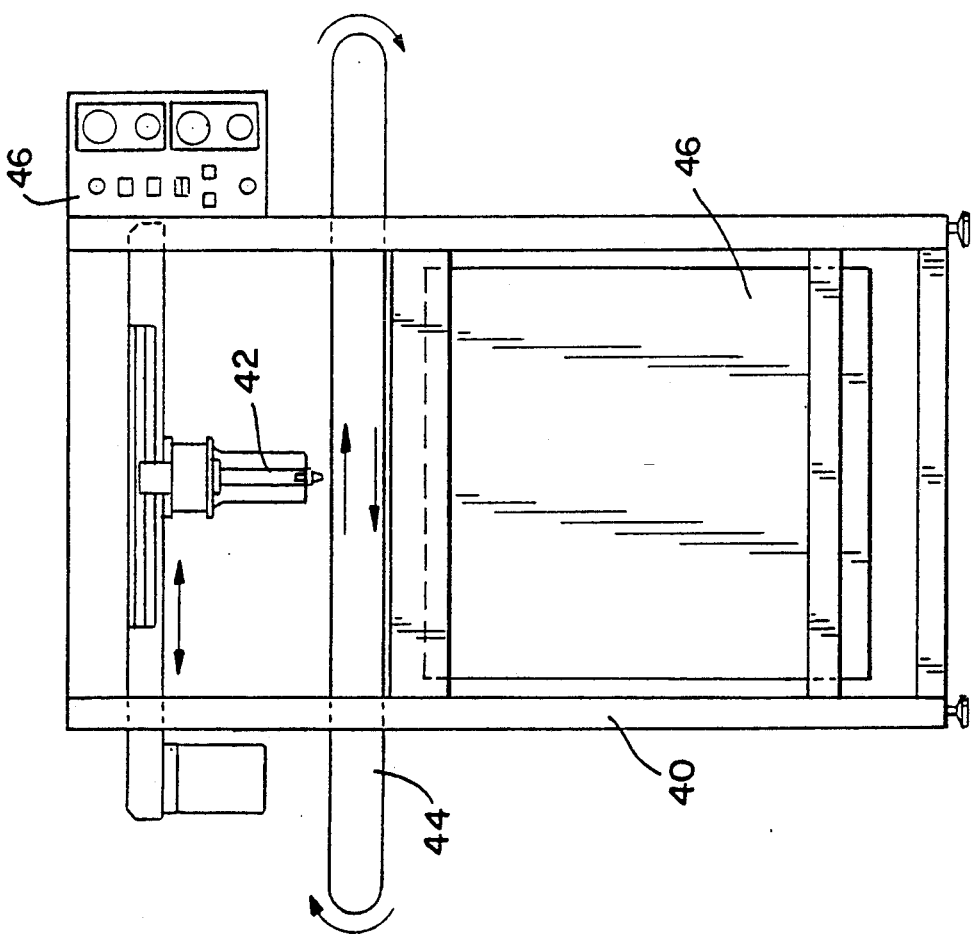
FIG. 3 is an elevational view of the flux dispensing apparatus according to the subject invention.
Figure 6:
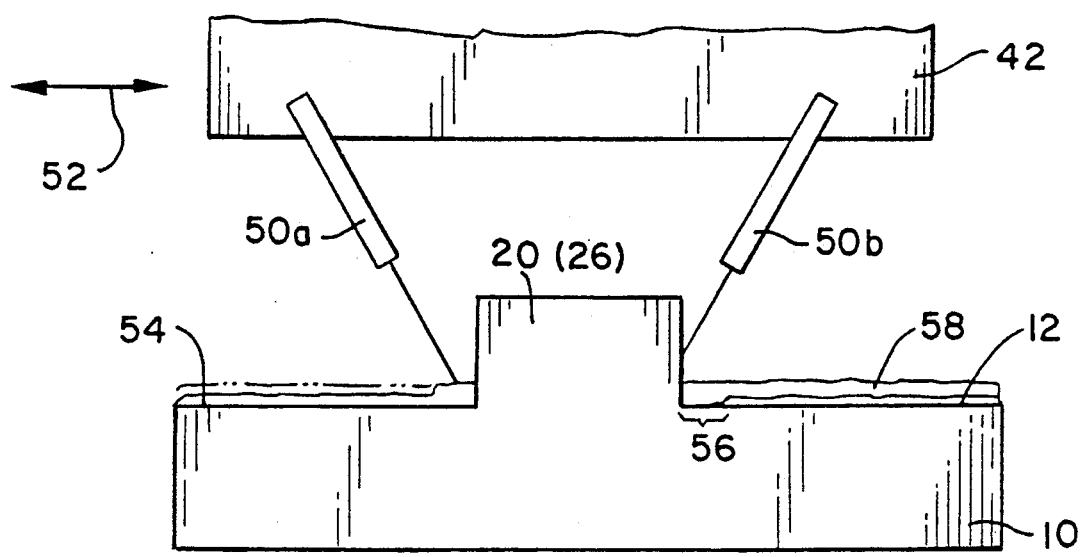
FIG. 6 is a greatly enlarged elevational view showing the use of two dispensing tips tilted at an angle relative to a printed circuit board.
Figure 7:
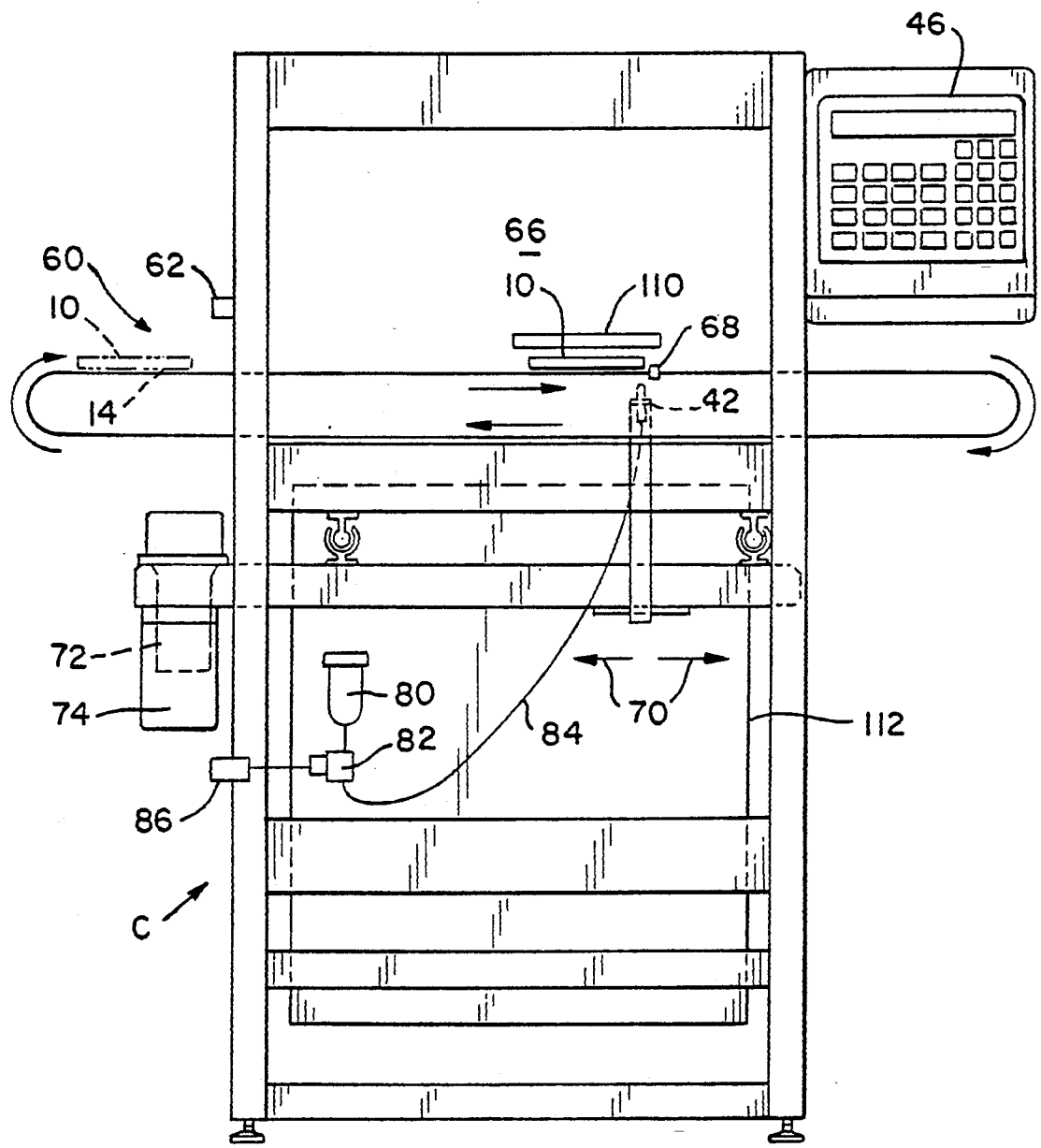
FIG. 7 is an elevational view of the flux dispensing apparatus disposed below the printed circuit board.
Figure 8:
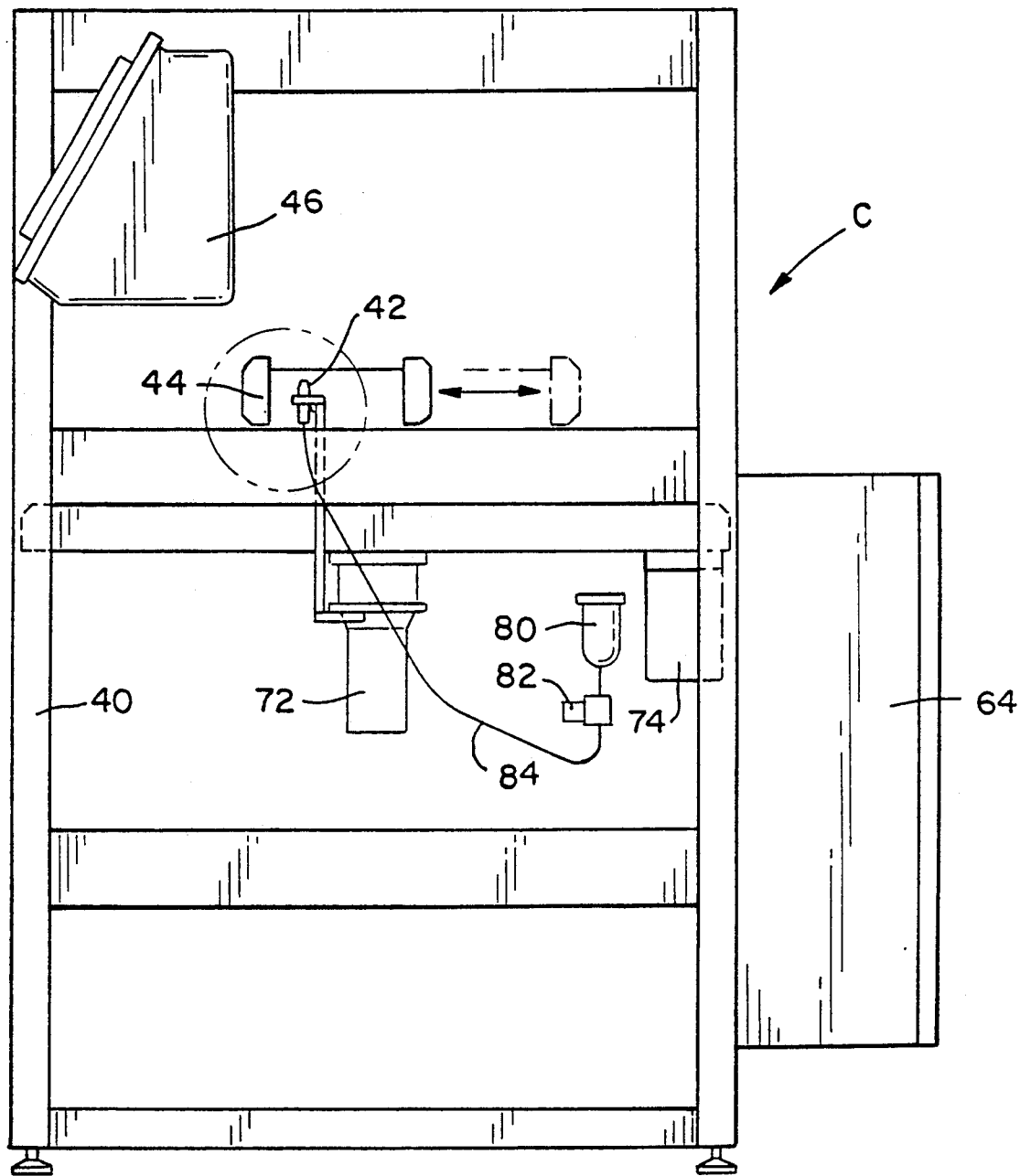
FIG. 8 is an end view taken from the right-hand side of FIG. 7.
Figure 9:
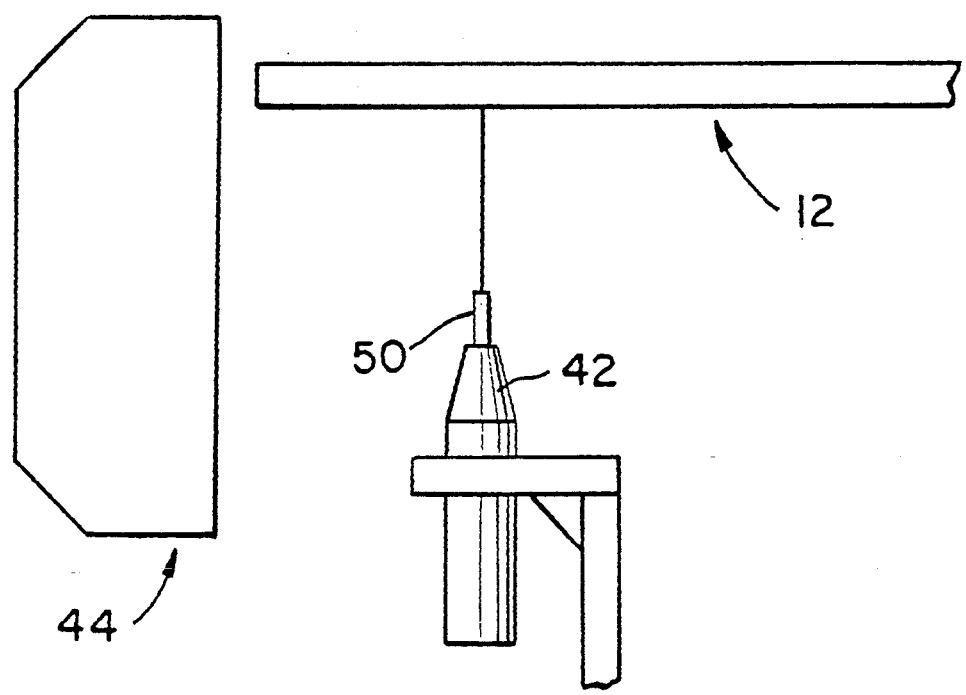
FIG. 9 is an enlarged view of the dispensing arrangements of FIGS. 7 and 8.

With continued reference to FIGS. 3-5, and continued to reference to FIG. 6, a multi-tip dispensing head will be described. One preferred arrangement includes a pair of needles 50a, 50b secured to one or more dispensing heads 42. The needles 50a and 50b are each tilted or angularly disposed from perpendicular relative to the surface of the printed circuit board 12. As shown in that FIGURE, the printed circuit board is incrementally traveling on a path extending out of the page (along the first axis X). The dispensing head, on the other hand, moves transverse to that path as indicated by the arrow 52 (parallel to the second axis Y). On the first pass across the surface 12, a layer of flux 54 is applied. Because of the protruding nature of the electrical component 20 or 26, and because of the relative speed of the dispensing head relative to the board, a phenomenon known as shadowing occurs. Thus as the dispensing head moves rightwardly, the horizontal surface represented by numeral 56 will receive a small amount, if any, of the layer of flux 54 as it is applied. Upon leftward reciprocation of the dispensing head, the second layer of flux 58 will eliminate the shadowing effect of area 56. Thus, a more even distribution of flux is achieved by coating the surface twice through use of multiple passes.

Additionally, tilting the needles 50a and 50b relative to perpendicular eliminates problems associated with shadowing. It also assures that the flux will be applied slightly beneath the components mounted on the board.

The flux can be dispensed from the head through use of a syringe type dispenser, or alternatively a valved arrangement can be used. Under either arrangement, the dispensing of flux in a continuous, thin stream across the surface of the printed circuit board can be achieved. Further, by control of the dispensing head with the microprocessor, timed regulation can dispense flux over predetermined areas. For example, on a single pass across the width of a board, flux can be alternately applied, shut off, and applied as the tip proceeds across the surface. Again, this leads to a more uniform application of flux and only applies flux where desired. Also by virtue of the dispenser head, problems associated with open reservoirs of flux are eliminated. Precise control of the specific gravity of the flux can be maintained since the flux is not exposed to the environment until it leaves the tip 50 of the dispensing head.

Although the FIGURES show the dispensing head disposed above the board at a predetermined height of approximately 0.040 inches to 0.30 inches and dispensed at a rate on the order of 0.02 cc/sec to apply the flux at e rate of approximately 0 .0002 g/in$^2$, it is contemplated that the above described structure and process is equally applicable to an arrangement where the flux is dispensed from a head located beneath the board. The parameters may be altered somewhat to accommodate the reversed position the dispensing head but the application rate will be generally the same.

Control of flux application may also be enhanced by preheating the board so that the flux stays in place when applied. That is, some of the solvent will be driven from the flux and it will have a tendency to remain in place on the board and not be as prone to spreading if the board is preheated. This adds to the precision of dispensing a thin stream of flux on the board, particularly when multiple passes are used.

The invention has been described with reference to the preferred embodiment and method. Obviously, modifications and alterations will occur to others upon a reading and understanding of this specification. It is intended to include all such modifications and alterations insofar as they come within the scope of the appended claims or the equivalents thereof.

Having thus described the invention, what is claimed is:

1. A dispensing apparatus for applying flux to a surface such as a printed circuit board (PCB), the apparatus comprising:
   a dispensing head that applies a non-atomized stream of flux to form a layer of flux on the surface;
   means for advancing the dispensing head relative to the surface at a high rate of speed during the flux application; and
   the dispensing head being tilted relative to the surface for laying flux at an angle substantially less than orthogonal thereto to limit shadowing.

2. The dispensing apparatus as defined in claim 1 further comprising means for incrementally advancing the surface relative to the dispensing head.

3. The dispensing apparatus as defined in claim 2 further comprising means for reciprocating the dispensing head generally transverse to the direction of movement of the surface.

4. The dispensing apparatus as defined in claim 1 includes means for regulating the application of flux on and off from the dispensing head as it passes the surface.

5. The dispensing apparatus as defined in claim 1 wherein the tilted dispensing head includes at least a first tip tilted at an angle for applying flux to the surface.

6. The dispensing apparatus as defined in claim 5 wherein the dispensing head includes a second tip disposed generally perpendicular to the first tip to limit shadowing.

7. A flux dispensing apparatus for applying flux to a printed circuit board (PCB), the dispensing apparatus including:
   a dispensing head operatively associated with a supply of flux and located below and adjacent the travel path of the board for applying a non-atomized stream of flux at a high rate of speed to a bottom surface of the board thereon; and
   means for incrementally advancing the board relative to the dispensing head so that the flux is applied to a desired portion of the board when the board is stationary and then one of the board and dispensing head is advanced a predetermined distance to receive another application of flux to another desired portion of the board.

8. The dispensing apparatus as defined in claim 7 further comprising means for moving the dispensing head generally transverse to the board to apply flux thereto.

9. The dispensing apparatus as defined in claim 7 wherein the incremental advancing means includes an incrementing conveyor means that moves the board in predetermined increments and means for actuating movement of the dispensing head generally transverse to the board to apply flux thereto.

10. The dispensing apparatus as defined in claim 7 wherein the dispensing head has an orifice diameter of approximately 0.010 inches or less.

11. The dispensing apparatus as defined in claim 7 further comprising means for advancing the dispensing head at a range of speed between 20 and 90 inches per second.

12. The dispensing apparatus as defined in claim 7 further comprising means for advancing the dispensing head at a speed of 20 inches per second or greater.

13. The dispensing apparatus as defined in claim 7 further comprising means for advancing the dispensing head at a speed approximately 40 inches per second.

14. A dispensing apparatus for applying flux to a surface of a printed circuit board (PCB), the dispensing apparatus comprising:
a dispensing head operatively associated with a supply of flux and the dispensing head being disposed below the board for laying a thin, stream of flux on an underside surface of the board at a speed on the order of 20 to 90 inches per second; and
means for moving the dispensing head and surface relative to one another.

15. The dispensing apparatus as defined in claim 14 further comprising a supply of flux in operative fluid communication with the dispensing head.

16. The dispensing apparatus as defined in claim 14 further comprising means for incrementally advancing the board after traversal of the dispensing head relative thereto to apply flux to an adjacent area of the underside surface.

17. The dispensing apparatus as defined in claim 14 further comprising means for reciprocating the dispensing head generally transverse to the direction of movement of the surface.

18. The dispensing apparatus as defined in claim 14 wherein the laying means lays the stream of flux at approximately 40 inches per second.

19. The dispensing apparatus as defined in claim 14 wherein the laying means includes a dispensing tip angularly disposed relative to the board to limit shadowing.

* * * * *